(12) United States Patent
Zhao et al.

(10) Patent No.: US 11,331,722 B2
(45) Date of Patent: May 17, 2022

(54) APPARATUS AND METHOD FOR PRODUCTION AND ENCAPSULATION OF SMALL PARTICLES AND THIN WIRES

(71) Applicant: Western New England University, Springfield, MA (US)

(72) Inventors: Jingzhou Zhao, East Longmeadow, MA (US); Max Aaron Martel, Fairfield, CT (US); Yuri Andrew Gulak, Woodbury, CT (US)

(73) Assignee: WESTERN NEW ENGLAND UNIVERSITY, Springfield, MA (US)

( * ) Notice: Subject to any disclaimer, the term of this patent is extended or adjusted under 35 U.S.C. 154(b) by 165 days.

(21) Appl. No.: 16/583,710

(22) Filed: Sep. 26, 2019

(65) Prior Publication Data

US 2020/0114421 A1    Apr. 16, 2020

Related U.S. Application Data

(60) Provisional application No. 62/738,071, filed on Sep. 28, 2018.

(51) Int. Cl.
*B22F 9/08*     (2006.01)
*B22F 1/16*     (2022.01)
*C03B 23/07*    (2006.01)

(52) U.S. Cl.
CPC .......... *B22F 1/16* (2022.01); *B22F 9/08* (2013.01); *C03B 23/073* (2013.01); *B22F 2302/256* (2013.01)

(58) Field of Classification Search
None
See application file for complete search history.

(56) References Cited

U.S. PATENT DOCUMENTS

| 3,791,172 | A | 2/1974 | Manfre et al. |
| 4,181,256 | A * | 1/1980 | Kasagi ............ B05B 7/224 239/81 |
| 4,613,076 | A | 9/1986 | Dietz et al. |
| 4,652,988 | A | 3/1987 | McLain, Sr. et al. |
| 7,309,500 | B2 | 12/2007 | Kim et al. |
| 7,569,847 | B2 | 8/2009 | Majumdar et al. |
| 8,366,986 | B2 | 2/2013 | Green et al. |

(Continued)

FOREIGN PATENT DOCUMENTS

CN     108311707 A  *  7/2018

OTHER PUBLICATIONS

English Translation of CN 108311707 (originally published Jul. 24, 2018) obtained from Espacenet.*

(Continued)

*Primary Examiner* — George Wyszomierski
(74) *Attorney, Agent, or Firm* — Cantor Colburn LLP

(57) ABSTRACT

A method of forming one of a plurality of encapsulated crystalline particles includes feeding a coaxial feed wire downwardly such that a first wire end of the coaxial feed wire is positioned at a heating source. The coaxial feed wire includes a crystalline wire core, and an amorphous shell surrounding the crystalline wire core. The first end of the coaxial feed wire is heated at the heating source, thereby forming a molten pendant drop at the first wire end. The plurality of encapsulated crystalline particles are emitted from the molten pendant drop onto a collector located below the molten pendant drop.

15 Claims, 6 Drawing Sheets

(56) References Cited

U.S. PATENT DOCUMENTS

2010/0297433 A1    11/2010   Kamisasa et al.
2016/0243638 A1     8/2016   Berube et al.
2019/0088167 A1*   3/2019   Jeon ..................... G09G 3/3233
2019/0143449 A1*   5/2019   Zenou ................ B23K 26/0622
                                                               219/76.1

OTHER PUBLICATIONS

International Search Report for International Application No. PCT/US2019/053176; International Filing Date Sep. 26, 2019; dated Jan. 30, 2020; 7 Pages.

Invitation to Pay Additional Fees Issued In PCT Application No. PCT/US19/53176, dated Dec. 3, 2019, 2 Pages.

Written Opinion for International Application No. PCT/US2019/053176; International Filing Date Sep. 26, 2019; dated Jan. 30, 2020; 10 Pages.

International Preliminary Report on Patentability; International Application No. PCT/US2019/053176; International Filing Date: Sep. 26, 2019; dated Apr. 8, 2021; 7 pages.

* cited by examiner

APPARATUS AND METHOD FOR PRODUCTION AND ENCAPSULATION OF SMALL PARTICLES AND THIN WIRES

CROSS-REFERENCE TO RELATED APPLICATIONS

This application claims the benefit of 62/738,071, filed Sep. 28, 2018, which is incorporated herein by reference in its entirety.

BACKGROUND

Exemplary embodiments pertain to the art of encapsulation of small particles and of thin wires.

Coaxial electrohydrodynamic (EHD) processing (e.g., electrospraying and electrospinning) and Flow Focusing (FF) are versatile tools for manufacturing and encapsulation of small particles and thin wires. However, available materials are limited requiring at least one of the constituent fluids be EHD or FF processable, having material properties, such as density, electrical conductivity, dielectric constant, viscosity, and surface tension, be within a certain range, so that a stable cone-jet geometry can be formed, and drive the other fluid by momentum transfer.

Conventional EHD and FF methods to controllably produce particles and wires from molten crystalline materials (e.g. metals, semiconductors, ceramics, salts etc.) face tremendous technical difficulties (i.e. high vacuum and high temperature) due to their high melting point, high electrical conductivity, high surface tension, high reactivity, and low viscosity. Direct EHD processing and FF of molten polymers and molten glasses, materials of which the majority, if not all, of its composition is amorphous silicon dioxide, such as soda lime glass, borosilicate glass, fused silica, etc., on the other hand, is also challenging due to their low electrical conductivity and high viscosity.

BRIEF DESCRIPTION

In one embodiment, a method of forming one of a plurality of encapsulated crystalline particles includes feeding a coaxial feed wire downwardly such that a first wire end of the coaxial feed wire is positioned at a heating source. The coaxial feed wire includes a crystalline wire core, and an amorphous shell surrounding the crystalline wire core. The first end of the coaxial feed wire is heated at the heating source, thereby forming a molten pendant drop at the first wire end. The plurality of encapsulated crystalline particles are emitted from the molten pendant drop onto a collector located below the molten pendant drop.

Additionally or alternatively, in this or other embodiments a second wire end of the feed wire opposite the first wire end is connected to a high voltage source.

Additionally or alternatively, in this or other embodiments the high voltage source applies a voltage in a range of 0-100 kV across the crystalline wire core.

Additionally or alternatively, in this or other embodiments a flow of sheath gas is positioned around the coaxial feed wire upstream of the heating source.

Additionally or alternatively, in this or other embodiments a grounded electrode is positioned beneath the molten pendant drop.

Additionally or alternatively, in this or other embodiments the plurality of encapsulated crystalline particles are one or more small core particles or thin core wires.

Additionally or alternatively, in this or other embodiments the one or more small core particles are less than 1 mm in diameter.

Additionally or alternatively, in this or other embodiments the thin core wires are less than 100 μm in diameter.

Additionally or alternatively, in this or other embodiments the heating source heats the feed wire by one or more of resistive heating, induction heating, torch heating, laser heating, microwave heating, electron beam heating, or plasma heating.

Additionally or alternatively, in this or other embodiments the collector is grounded.

In another embodiment, an apparatus for depositing a plurality of encapsulated crystalline particles includes a coaxial feed wire having a crystalline wire core and an amorphous shell surrounding the crystalline wire core. The apparatus further includes a heating source at which a first wire end of the coaxial feed wire is positioned, and a collector located below the heating source. Heating of the first wire end at the heating source forms a molten pendant drop at the first wire end from which a plurality of encapsulated crystalline particles are emitted onto the collector.

Additionally or alternatively, in this or other embodiments the coaxial feed wire is located at a pressure controlled chamber.

Additionally or alternatively, in this or other embodiments a flow of sheath gas is located around the coaxial feed wire upstream of the heating source.

Additionally or alternatively, in this or other embodiments a grounded electrode is positioned below the molten pendant drop.

Additionally or alternatively, in this or other embodiments a second wire end of the feed wire opposite the first wire end is connected to a high voltage source. The high voltage source applies a voltage in a range of 0-100 kV across the crystalline wire core.

Additionally or alternatively, in this or other embodiments the plurality of encapsulated crystalline particles are one or more small core particles or thin core wires.

Additionally or alternatively, in this or other embodiments the one or more small core particles are less than 1 mm in diameter.

Additionally or alternatively, in this or other embodiments the thin core wires are less than 100 μm in diameter.

Additionally or alternatively, in this or other embodiments the heating source heats the feed wire by one or more of resistive heating, induction heating, torch heating, laser heating, microwave heating, electron beam heating, or plasma heating.

Additionally or alternatively, in this or other embodiments the collector is grounded.

In yet another embodiment, a method of forming a coaxial feed wire includes feeding solid crystalline core into a tubular amorphous shell, heating a portion of the solid crystalline core and the tubular amorphous shell at a furnace, and applying a vacuum into the tubular amorphous shell to control a rate of flow of a heated molten portion of the crystalline core.

Additionally or alternatively, in this or other embodiments the solid crystalline core is fed into the tubular amorphous shell via a seal in the tubular amorphous shell.

Additionally or alternatively, in this or other embodiments a rate of flow of a molten portion of the tubular amorphous shell is substantially equal to the flow rate of the heated molten portion of the crystalline core.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

In the present disclosure, by using a core that has a much higher electrical conductivity, but much lower viscosity than the shell, two non-EHD and non-FF processable fluids under the coaxial configuration become EHD and/or FF processable, facilitated by a mechanism referred to herein as Electro-Flow-Focusing Viscous Entrainment (EFF-VE). The method is described in detail below in the context of molten metal and molten glass as the two fluids. It is to be appreciated that the use of molten metal and molten glass are merely exemplary, and that in other embodiments other non-EHD or non-FF processable fluids may be utilized.

Figure 1A:
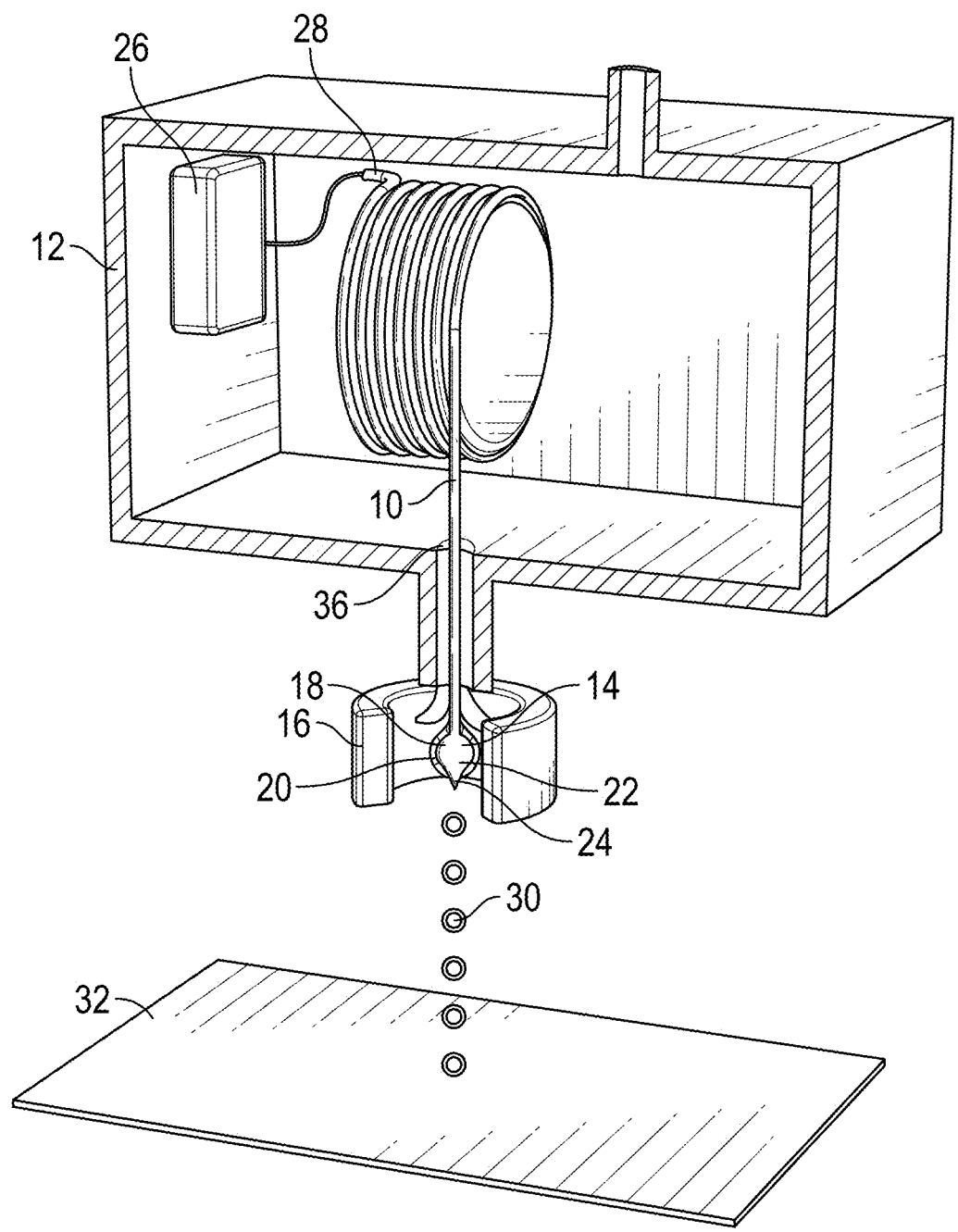
FIG. 1(a) is an illustration of a method of depositing particles on a grounded electrode or collector.
Figure 1B:
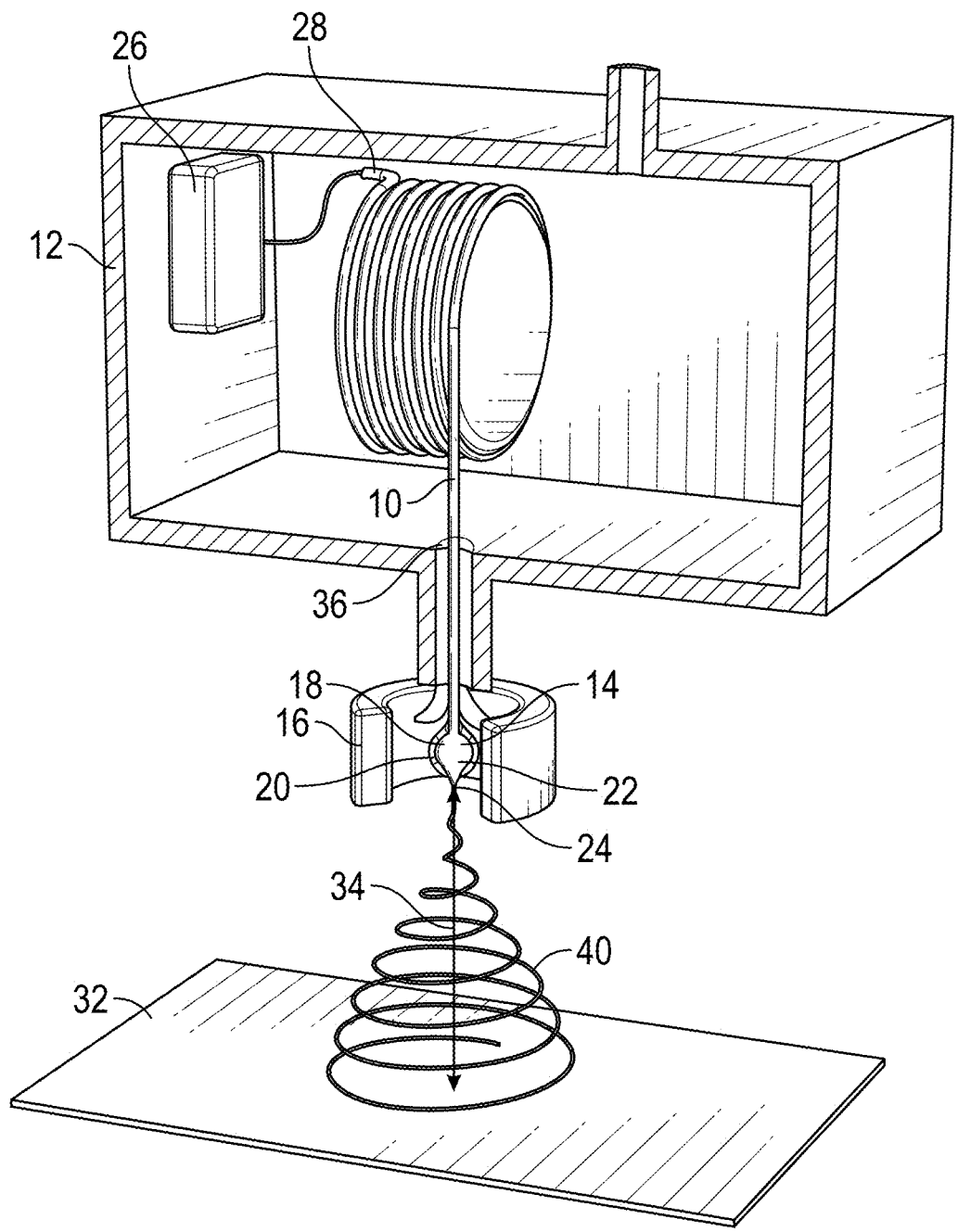
FIG. 1(b) is an illustration of a method of depositing wires on a grounded electrode or collector.

During exemplary EFF-VE processes, as shown in FIGS. 1(a) and 1(b), a coaxial feed wire 10 (e.g. glass coated metal microwire, polymer coated metal microwire, or silica coated metal microwire, etc.) is slowly fed downward from a pressure-controlled chamber 12 and a feed wire tip 14 is heated by a heating source 16. The heating source 16 may utilize methods of heating including but are not limited to resistive heating, induction heating, torch heating, laser heating, microwave heating, electron beam heating, plasma heating, etc. to heat the feed wire 10. The feed wire 10 includes a crystalline wire core 18 and an amorphous shell 20 surrounding the crystalline wire core 18. The feed wire 10 is heated to a wire temperature high enough to melt both the crystalline wire core 18 and the amorphous shell 20 forming a molten pendant drop 22 at a first wire end 24.

The crystalline wire core 18 is connected to a high voltage source 26, in some embodiments in the range of about 0~100 kV, at a second wire end 28 opposite the first wire end 24.

A plurality of small core particles 30, as shown in FIG. 1(a), less than 1 mm in diameter, or thin core wires 40, as shown in FIG. 1(b), less than 100 μm in diameter, then begin to emit from the molten pendant drop 22 onto a grounded electrode 32 placed beneath the molten pendant drop 22. In some embodiments, the shape of the grounded electrode 32 may be a plate, a ring, a wire mesh, a rotating drum, a set of parallel bars, etc. In some embodiments, the grounded electrode 32 serves as a collector or container of the produced plurality of small core particles 30 and thin core wires 40. In other embodiments, a separate collector is placed below the grounded electrode 32.

Whether the plurality of small core particles 30 or thin core wires 40 are formed depends on a myriad of factors such as the voltage of the high voltage source 26, a drop distance 34 from the molten pendant drop 22 to the grounded electrode 32, initial wire diameter of the crystalline wire core 18, thickness of the amorphous shell 20, wire feeding speed into the heating source 16, power of heating by the heating source 16, the pressure inside the pressure-controlled chamber 12, and the flow rate of the sheath gas 36 circumferentially around the feed wire 10, etc. In some embodiments, the sheath gas 36 induces reactions that form ceramic core particles and wires or prevents reactions for metal core particles and wires. It also straightens and stabilizes the feed wire 10.

The synergistic effect emerges during EHD or FF processing of the coaxial material pairs with large conductivity ratio (>>1) and small viscosity ratio (<<1). The large conductivity ratio ensures that positive charges are accumulated on the core/shell interface. The accumulated charges being attracted toward the grounded electrode 32 along with the shear force induced by the sheath gas 36 facilitate the elongation of the insulating viscous amorphous shell, which in turn entrain the low viscosity core within. Since a shell geometry has much smaller cross-sectional area than a cylinder of the same diameter, as a result much higher extensional stress is developed in the viscous shell than that in a viscous cylinder under the same electrical force or shear force. Because it is the magnitude of the extensional stress compared to the interfacial tension that determines whether viscous entrainment of a low viscosity core is initiated, the voltage or flow rate needed to initiate EFF-VE is much lower than that needed to initiate the EHD or FF processing of its constituent fluids individually in a cylindrical geometry. In some embodiments, when voltage applied at the second wire end 28 is reduced to zero, the formation of small core particles 30 or thin core wires 40 is completely attributed to the shearing effect of the sheath gas 36, and the process can be called Flow-Focused Viscous Entrainment (FF-VE). Similarly, when the flow rate of the sheath gas 36 is reduced to zero, the formation of small core particles 30 or thin core wires 40 is completely attributed to the charge accumulated at the first wire end 24 due to the voltage applied at the second wire end 28, and the process may be called Electro-Viscous Entrainment (E-VE).

Figure 2:
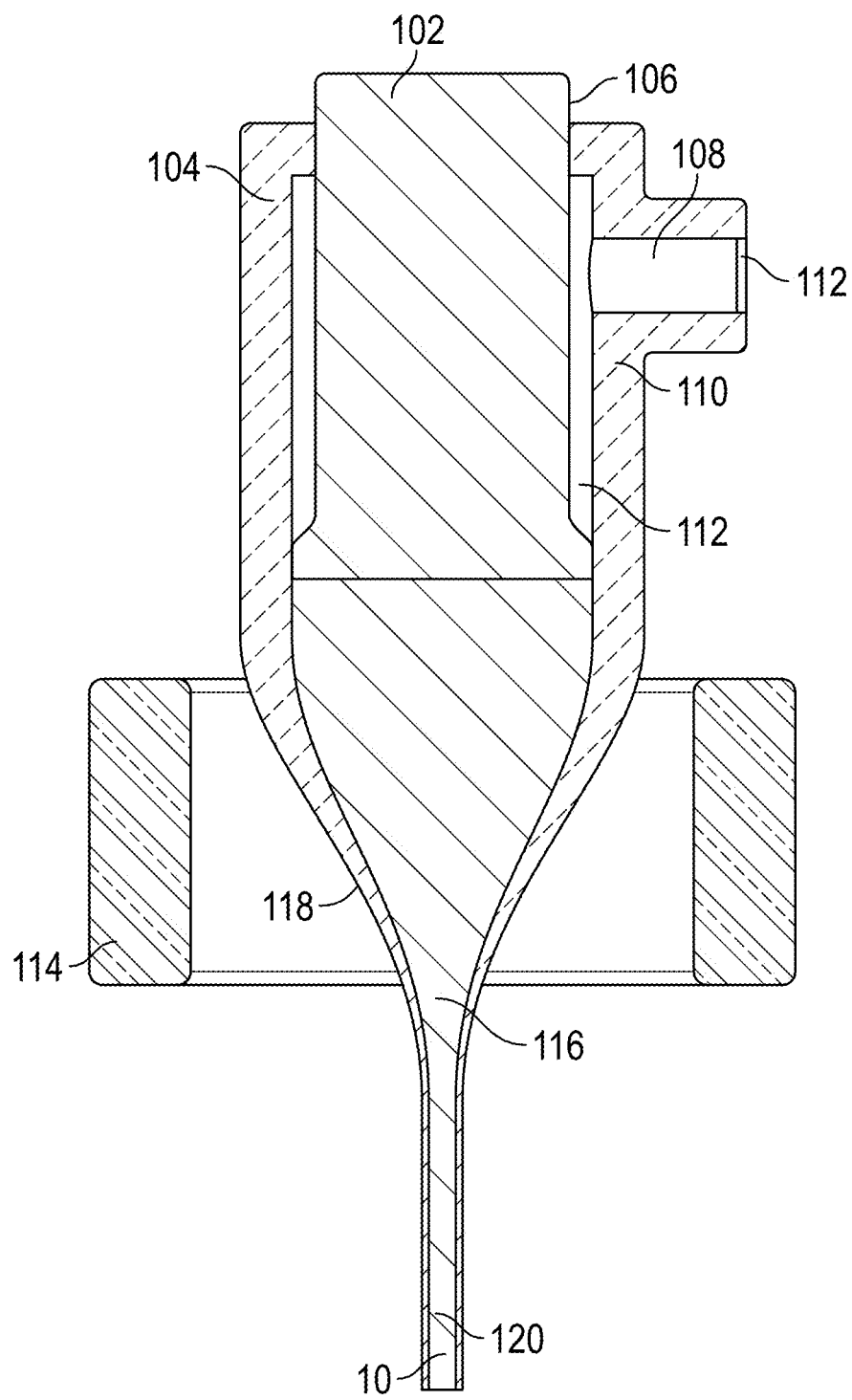
FIG. 2 is an illustration of a method of forming a coaxial feed wire.

In another embodiment, referring now to FIG. 2, a method referred to as Vacuum Stabilized Thermal Drawing (VSTD) is utilized to fabricate the coaxial feed wire 10 used for EFF-VE. The main challenge being addressed is the direct and independent flow rate control of a low viscosity core during coaxial thermal drawing. A simple yet effective method is utilized which stably holds a molten core 116 against gravity using a pressure difference between an induced vacuum and the atmosphere. As shown in FIG. 2, a solid core 102 is inserted into a shell 104 through a specially designed seal 106 that is hermetic but allows relative motion in the vertical direction. A shell hole 108 is opened on a sidewall 110 of the shell 104 and is connected to a vacuum system 112. During drawing, the solid core 102 and the shell 104 are independently fed in a downward direction, at a speed on the order of 10 μm/s into a furnace 114 in which both the solid core 102 and the shell 104 are melted. A molten core 116 and molten shell 118 are pulled downward at much faster, but still same speed relative to each other, forming a uniform and continuous coaxial microwire 120. When the vacuum system 112 is operating, the molten shell 118 is under compression from all directions because pressure inside the molten shell 118 is much lower than outside. The compression force squeezes the molten shell 118 and causes the molten core 116 to flow backward into a core gap 122 between the solid core 102 and the shell 104, which then solidifies due to the lower temperature above, thus converting the solid core 102 into a plunger whose speed relative to the shell 104 controls the flow rate of the molten core 116 beneath.

Figure 3A:
FIG. 3(a) in an illustration of results of a first material drawing method.
Figure 3B:
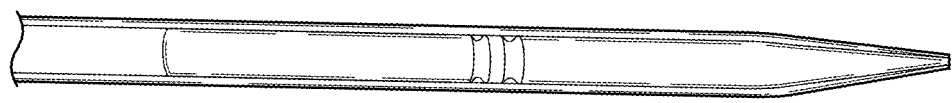
FIG. 3(b) is an illustration of results of a second material drawing method.

FIGS. 3(a) and 3(b) show the effect of vacuum on the drawing. A failed example is shown in FIG. 2 and FIG. 3(a) where the molten core 116 breaks apart from the solid core 102 under gravity without operation of the vacuum system 112. The molten core 116 stays attached to the solid core 102 when vacuum is maintained throughout the whole drawing process, as shown in FIG. 2 and FIG. 3(b), achieving direct flow rate control. In other methods, flow rate of the core has always been a derived quantity that depends on other process parameters and material properties, hence is being controlled indirectly. With direct flow rate control of the molten core 116, VSTD makes possible thermal drawing of coaxial microwire 120 with ultrathin coating that is not achievable by any other existing methods.

The EFF-VE process enables facile and scalable production of 1) crystalline micro/nanoparticles with or without polymer/glass/silica encapsulation; 2) continuous or high aspect ratio encapsulated crystalline micro/nanowires; and 3) continuous or high aspect ratio polymer/glass/silica encapsulated crystalline micro/nanowires. EFF-VE make possible the production of exotic particles and wires with niche applications in energy, biomedical, aerospace electronics, and chemical industries for bio-sensing/imaging, cancer treatment, energy storage, catalysts, water treatment, nanocomposites, 3D printing, separation, enhancement of Liquid Crystal Display (LCD), Quantum Dot Light Emitting Diode (QLED), and electrorheological fluids, etc. For nanomaterials that can be produced by other existing methods, EFF-VE also hold great promise for higher throughput, better dimensional control, higher yield, and lower cost.

Figure 4A:
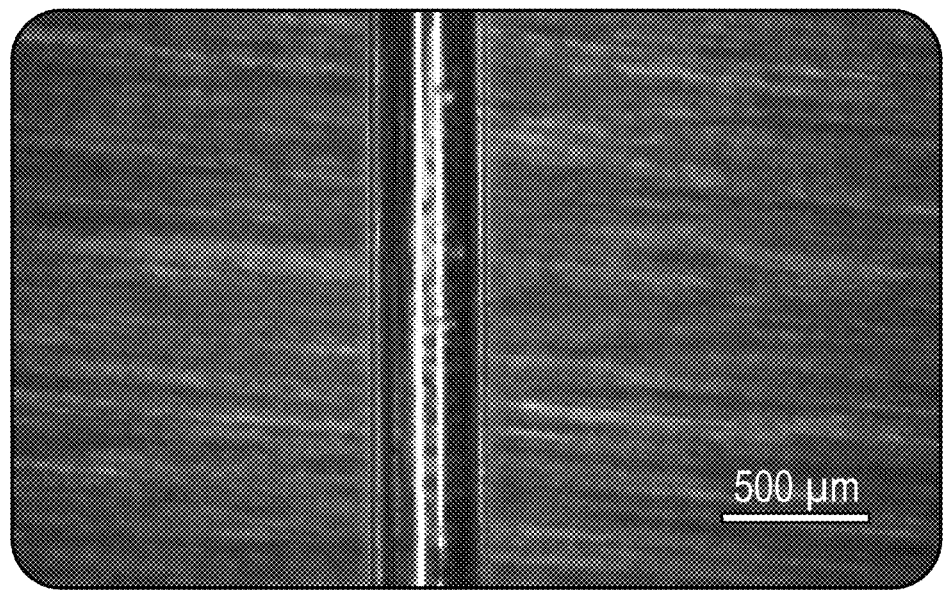
FIG. 4(a) illustrates experimental results of a Pyrex® coated Sn microwire fabricated by VSTD.
Figure 4C:
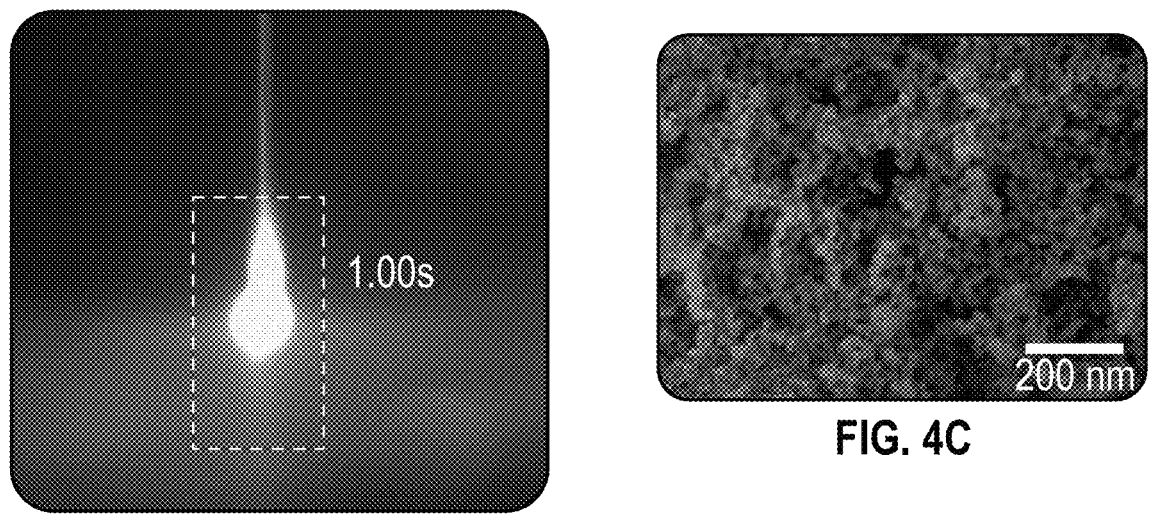
FIG. 4(c) illustrates an SEM image of particles produced by EVE.
Figure 4B:
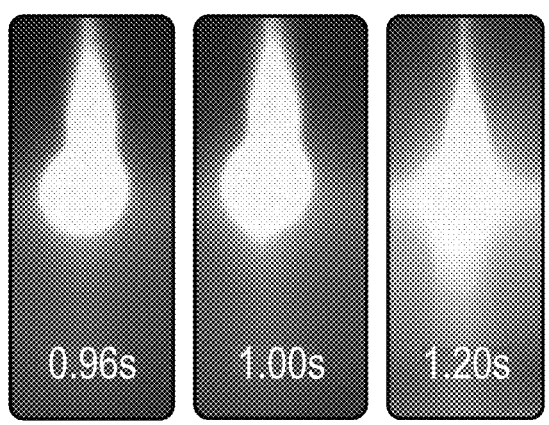
FIG. 4(b) illustrates an the onset of EVE captured by a high-speed camera.
Figure 4D:
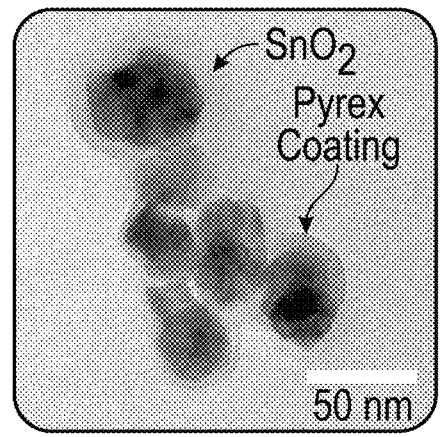
FIG. 4(d) illustrates a TEM image of core-shell particles produced by EVE.

A Pyrex® glass coated Sn microwire (200 μm shell diameter) with a shell to core diameter ratio of 1.3 fabricated by VSTD is used to demonstrate the feasibility of E-VE. A focused $CO_2$ laser is used as the heating source. A voltage of 2 kV is applied to the Sn core whose tip is held at 2 cm above the grounded collector plate. The onset of EVE is captured by a high-speed camera as shown in FIG. 4(b). Without the sheath gas, glass encapsulated $SnO_2$ nanoparticles are formed under the aforementioned process conditions as best shown in FIG. 4(a). Scanning Electron Microscopy (SEM) shows good size uniformity of the particles in FIG. 4(c). Transmission Electron Microscopy (TEM) confirms the core-shell structure as shown in FIG. 4(d). Energy Dispersive Spectroscopy (EDS) suggests that particles formed are encapsulated $SnO2$.

Figure 5A:
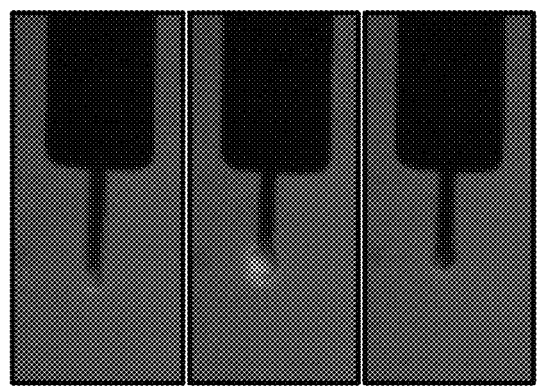
FIG. 5(a) illustrates high-speed camera images during FF-VE of a Pyrex® coated Cu microwire.
Figure 5B:
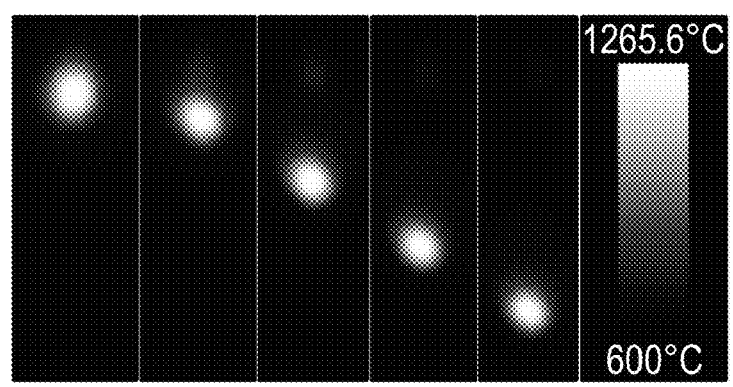
FIG. 5(b) illustrates high-speed thermal images during FF-VE of a Pyrex® coated Cu microwire.
Figure 5C:
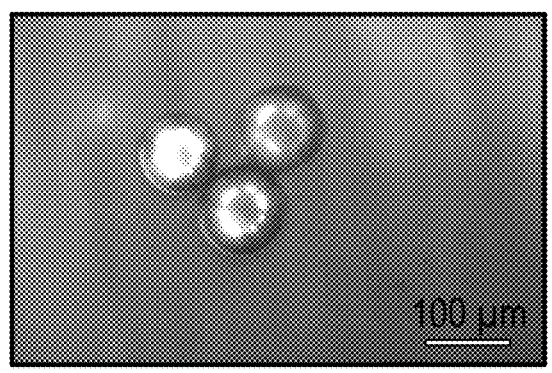
FIG. 5(c) illustrates an optical microscope image of Pyrex® coated Cu microparticles.
Figure 5D:
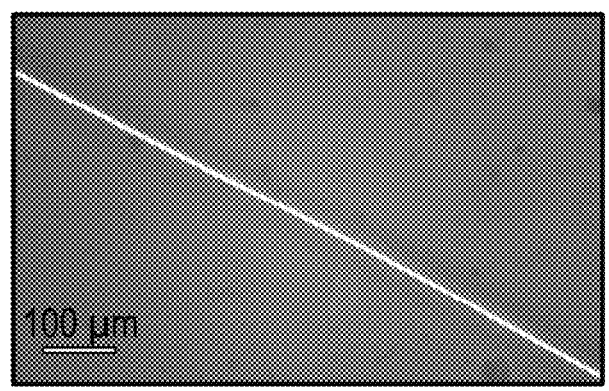
FIG. 5(d) illustrates an optical microscope image of a Pyrex® coated Cu microwire.

In some embodiments, a commercially available Pyrex® glass coated Cu is used to fabricate Pyrex® coated Cu micro particles using FF-VE. A focused $CO_2$ laser may be used as the heat source, and no voltage is applied to the Cu core. The onset of FF-VE is captured by a high-speed camera, in FIG. 5(a), and a high speed thermal imager, in FIG. 5(b). Pyrex® encapsulated Cu micro particles are formed, as shown in FIGS. 5(c) and 5(d).

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of forming one of a plurality of particles, comprising:
   feeding a microwire such that a first wire end of the microwire is disposed at a heating source;
   heating the first end of the microwire at the heating source, thereby forming a molten pendant drop at the first wire end;
   positioning a flow of sheath gas around the microwire upstream of the heating source; and
   emitting the plurality of particles from the molten pendant drop;
   wherein the microwire includes:
      a crystalline wire core; and
      an amorphous shell surrounding the crystalline wire core.

2. The method of claim 1, wherein the plurality of particles are one or more encapsulated crystalline core particles.

3. The method of claim 2, wherein the one or more encapsulated crystalline core particles are less than 1 mm in diameter.

4. The method of claim 1, wherein the heating source heats the microwire by one or more of resistive heating, induction heating, torch heating, laser heating, microwave heating, electron beam heating, or plasma heating.

5. The method of claim 1, further comprising positioning an electrode beneath the molten pendant drop.

6. The method of claim 5, further comprising connecting a second wire end of the microwire opposite the first wire end to a voltage source.

7. The method of claim 6, wherein the voltage source applies a voltage in a range of −100 kV∼100 kV across the microwire and the electrode.

8. A method of forming one of a plurality of wires, comprising:
feeding a microwire such that a first wire end of the microwire is disposed at a heating source;
heating the first end of the microwire at the heating source, thereby forming a molten pendant drop at the first wire end; and
positioning a flow of sheath gas around the microwire upstream of the heating source; and
emitting the plurality of wires from the molten pendant drop.

9. The method of claim 8, wherein the microwire has a crystalline wire core; and an amorphous shell surrounding the crystalline wire core.

10. The method of claim 8, further comprising positioning an electrode beneath the molten pendant drop.

11. The method of claim 10, further comprising connecting a second wire end of the microwire opposite the first wire end to a voltage source.

12. The method of claim 11, wherein the voltage source applies a voltage in a range of −100 kV∼100 kV across the microwire and the electrode.

13. The method of claim 8, wherein the plurality of wires are one or more encapsulated thin crystalline core wires.

14. The method of claim 13, wherein the encapsulated thin crystalline core wires are less than 100 μm in diameter.

15. The method of claim 8, wherein the heating source heats the microwire by one or more of resistive heating, induction heating, torch heating, laser heating, microwave heating, electron beam heating, or plasma heating.

* * * * *